US009788021B2

United States Patent
Margis et al.

(10) Patent No.: US 9,788,021 B2
(45) Date of Patent: Oct. 10, 2017

(54) DISPLAY SYSTEM FOR A VEHICLE ENTERTAINMENT SYSTEM

(71) Applicant: Panasonic Avionics Corporation, Lake Forest, CA (US)

(72) Inventors: Paul Anthony Margis, Irvine, CA (US); Craig Depner, Trabuco Canyon, CA (US); Mehdi Izadyar, Trabuco Canyon, CA (US); Omar Lopez, Norco, CA (US); Sangho Kim, Irvine, CA (US); Kaname Tomita, Osaka (JP); Mitsuhiro Tosa, Osaka (JP); Masashi Fujimoto, Osaka (JP)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 322 days.

(21) Appl. No.: 14/628,015

(22) Filed: Feb. 20, 2015

(65) Prior Publication Data

US 2016/0249073 A1   Aug. 25, 2016

(51) Int. Cl.
*H04N 21/214* (2011.01)
*H04N 21/414* (2011.01)
(Continued)

(52) U.S. Cl.
CPC ......... *H04N 21/2146* (2013.01); *B60R 11/02* (2013.01); *B60R 11/0235* (2013.01);
(Continued)

(58) Field of Classification Search
CPC ..... B60R 11/02; B60R 2300/00; B60R 16/00; B60R 2011/0015; B60R 2011/0017;
(Continued)

(56) References Cited

U.S. PATENT DOCUMENTS 3,037,812 A   6/1962   Monroe
D250,071 S   10/1978   Dickerson
(Continued)

FOREIGN PATENT DOCUMENTS

EP   1 078 852 A2   2/2001
WO   99/14655 A1   3/1999
(Continued)

OTHER PUBLICATIONS

Kirby, M., "Runway Girl, Pinnacle seat is B/E's hottest-every product launch," http://www.flightglobal.com/blogs/runway-girl/2010/08/pinnacle-seat-is-bes-hottest-e/, Aug. 2, 2010.
(Continued)

*Primary Examiner* — Jay Patel
*Assistant Examiner* — Marnie Matt
(74) *Attorney, Agent, or Firm* — Vista IP Law Group LLP

(57) ABSTRACT

A video display system for a passenger seat of a vehicle. The video display system is configured to be mounted to a seatback of each passenger seat or to other structure such that the system may be utilized by the passenger. The display system includes a video display assembly having a display housing configured to be mounted to structure in the vehicle. A video monitor is housed within the display housing. The video display assembly includes a depending tab portion disposed below the area of the video monitor. The depending tab portion includes a tab display capable of displaying a computer generated graphic and/or information. The display system may also have one or more indicator lights provided adjacent the external edge of the display housing.

20 Claims, 9 Drawing Sheets

(51) Int. Cl.
*B60R 11/02* (2006.01)
*B60R 11/00* (2006.01)
*H04N 5/655* (2006.01)

(52) U.S. Cl.
CPC .......... *H04N 21/41422* (2013.01); *B60R 2011/0012* (2013.01); *B60R 2011/0015* (2013.01); *B60R 2011/0017* (2013.01); *B60R 2011/0043* (2013.01); *B60R 2011/0071* (2013.01); *H04N 5/655* (2013.01)

(58) Field of Classification Search
CPC ......... B60R 11/0235; B60R 2011/0028; B60R 2011/0082; B60R 2011/0085; H04N 21/2146; H04N 21/41422; H04N 21/4122; H04N 5/64
USPC .................................................. 348/836–843
See application file for complete search history.

(56) References Cited

U.S. PATENT DOCUMENTS

| | | | |
|---|---|---|---|
| 4,647,980 A | 3/1987 | Steventon et al. | |
| D340,235 S | 10/1993 | Robak et al. | |
| 5,555,466 A | 9/1996 | Scribner et al. | |
| 5,610,822 A | 3/1997 | Murphy | |
| 5,808,660 A | 9/1998 | Sekine et al. | |
| 6,058,288 A | 5/2000 | Reed et al. | |
| 6,177,887 B1 | 1/2001 | Jerome | |
| 6,243,003 B1* | 6/2001 | DeLine | B60R 1/12 340/425.5 |
| 6,702,604 B1 | 3/2004 | Moscovitch | |
| 6,899,390 B2 | 5/2005 | Sanford et al. | |
| 6,929,218 B1 | 8/2005 | Sanford et al. | |
| 7,036,889 B2 | 5/2006 | Sanford et al. | |
| 7,124,426 B1 | 10/2006 | Tsuria et al. | |
| D577,503 S | 9/2008 | Priestman | |
| D669,873 S | 10/2012 | Margis et al. | |
| D669,874 S | 10/2012 | Margis et al. | |
| D677,639 S | 3/2013 | Margis et al. | |
| D688,060 S | 8/2013 | Sizelove | |
| D702,070 S | 4/2014 | Sizelove | |
| 2002/0045484 A1 | 4/2002 | Eck et al. | |
| 2004/0077308 A1 | 4/2004 | Sanford et al. | |
| 2005/0021602 A1 | 1/2005 | Noel et al. | |
| 2005/0132407 A1 | 6/2005 | Boyer, Jr. et al. | |
| 2005/0278754 A1 | 12/2005 | Bleacher et al. | |
| 2006/0107295 A1 | 5/2006 | Margis et al. | |
| 2008/0023600 A1 | 1/2008 | Perlman | |
| 2008/0060034 A1* | 3/2008 | Egnal | G01C 11/02 725/105 |
| 2009/0077595 A1 | 3/2009 | Sizelove et al. | |
| 2009/0079705 A1 | 3/2009 | Sizelove et al. | |
| 2009/0119721 A1 | 5/2009 | Perlman et al. | |
| 2010/0162326 A1 | 6/2010 | Bonar | |
| 2011/0174926 A1* | 7/2011 | Margis | B60N 2/4876 244/118.6 |
| 2012/0132746 A1* | 5/2012 | Sizelove | B64D 11/0015 244/118.6 |
| 2014/0176057 A1* | 6/2014 | Van Wiemeersch | H02J 7/0044 320/108 |
| 2014/0203770 A1 | 7/2014 | Salter et al. | |

FOREIGN PATENT DOCUMENTS

| | | |
|---|---|---|
| WO | 03/05000 A1 | 6/2003 |
| WO | 2006/052941 A1 | 5/2006 |

OTHER PUBLICATIONS

Kirby, M., "Runway Girl, Thales is Getting Slim Too," http://www.flightglobal.com/blogs/runway-girl/2010/04/airbus_a350_drives_innovation/, Apr. 12, 2010.

Thales Group Press Release, "Thales unveils revolutionary Immersive Business Class Seat," https://www.thalesgroup.com/en/worldwide/aerospace/press-release/thales-unveils-revolutionary-immersive-business-class-seat/, Apr. 8, 2014.

Unpublished pending U.S. Appl. No. 29/503,200, filed Sep. 24, 2014, Margis et al.

Unpublished pending U.S. Appl. No. 29/503,196, filed Sep. 24, 2014, Margis et al.

* cited by examiner

DISPLAY SYSTEM FOR A VEHICLE ENTERTAINMENT SYSTEM

BACKGROUND

The field of the invention generally relates to entertainment systems for vehicles, and more particularly, to display systems for entertainment systems in vehicles.

Typically, entertainment systems for vehicles have video displays installed at each passenger seat. For instance, most commonly, video displays are provided at each passenger seat, such as mounted at each of the seatbacks of the passenger seats, and/or on cabin walls and/or deployable from an armrest for seats located at a bulkhead, i.e., in the first row of a section. Many of these systems allow each passenger to select from multiple video channels and/or audio channels, or even individually select and play videos from a library of videos. These video displays may also provide access to games, communication applications (e.g., telephone service, messaging, etc.), internet browsing, and other computer applications. Sometimes such displays are referred to as smart monitors due to the ability to provide computer applications and process and store data internally.

Such entertainment systems may be installed, and are currently utilized on a variety of vehicles, including commercial passenger aircraft, passenger trains, automobiles, buses. For instance, many commercial passenger aircraft have in-flight entertainment system ("IFE") having video displays located at each passenger seat.

SUMMARY

In one embodiment, the present invention is directed to an innovative video display system for mounting to structure of a vehicle, such as a passenger seat, which provides additional functionality and an enhanced user experience. The video display system may be utilized with a vehicle entertainment system, such as an IFE system, or it may be self-contained with the hardware and software for functioning as an entertainment system, including for example, displaying videos, playing games, displaying travel information and notifications, etc.

The video display system is configured to be mounted to a structure of a vehicle, such as a seatback of each passenger seat, so that the display system may be utilized by the passenger seated in the vicinity of the structure, for instance, a passenger seated behind the seatback. The display system comprises a video display assembly having a display housing configured to be mounted to the vehicle structure. For example, the display housing may have a frame comprising a rear panel that faces toward the mounting structure and a front screen affixed to the rear panel that faces toward the passenger using the display system.

A video monitor is housed within the display housing such that the screen of the monitor is visible through a front side of the display housing. For instance, the front side may have an opening or a substantially transparent front screen. In one innovative aspect, the video display assembly has a depending tab portion disposed below the area of the video monitor. The depending tab portion is configured to provide a computer generated graphic message and/or other information to the passenger. To accommodate the depending tab portion, the display housing has a bottom edge having a first portion and a tab portion, wherein the tab portion extends lower than the first portion and the tab portion having a shorter length than the first portion. A tab display capable of displaying a computer generated graphic is housed within the display housing and positioned at the tab portion such that graphics displayed on the tab display are visible through a front side of the display housing, such as a tab portion of the front screen. As some examples, the tab display may be an OLED, LCD or LED having a minimum resolution for displaying graphics, but preferably an LCD or OLED display.

In another aspect of the display system, one or more indicator lights may be provided adjacent the external edge of the display housing. The indicator light(s) are configured to emit one of a plurality of different colors according to a signal to be indicated. As some examples, a red light may indicate that the passenger does not want to be disturbed such as for a meal or drink service, while a blue light may signal to call a flight attendant. The first indicator light is positioned such that when the first indicator light is lighted it is visible external to the display housing. The first indicator light may be located on one side of the display housing (e.g., the left side), and a second indicator light, the same or similar to the first indicator light, may be located on the other side of the display housing. This allows the light to be easily visible whether the aisle between the passenger seats is to the left or to the right of the display system.

In still another aspect of the present invention, the display system may also include a wireless charging station configured to inductively charge a portable electronic device (e.g., a mobile phone, tablet computer, or the like) via a power source in the vehicle. The wireless charging station may be mounted in an accessory housing configured to be mounted to the seatback adjacent the display housing. For instance, the accessory housing may be mounted below the display housing.

The accessory housing may also include a plurality of electronic ports, such as USB ports and audio jacks, such as headphone jacks. A reading light may also be mounted in the accessory housing.

In yet another aspect, the display system typically includes one or more electronics modules configured to operate the video monitor, and other peripherals such as the electronic ports and wireless charging station.

In another aspect of the present invention, the display system is configured to provide an immersive user experience within the constraints of a seatback mounted system. Accordingly, the display housing is substantially coextensive to both side edges and a top edge of the seatback. The video monitor size is also maximized within the envelope provided by the size of the display housing.

In another aspect of the present invention, the display system can be configured without the depending tab portion and tab display. Same or similar to the system described above, the display system includes a display housing configured to be mounted to a seatback and/or other structure. The display housing has a rear panel which faces toward the seatback and a front cover affixed to the rear panel which faces toward the passenger seated behind the seatback or other structure to which the displaying is mounted.

A main video monitor is housed within the display housing such that the screen of the monitor is visible through the front cover. For instance, the front cover may have a substantially transparent section covering the area of the screen. One or more indicator lights, the same as describe above, are provided adjacent the external edge of the display housing. The display system may also have one or more of the additional aspects described above with respect to the system having the depending portion.

In still another aspect of the present invention, any of the display systems described herein may be provided mounted to a seatback of a vehicle passenger seat, including but not limited to an aircraft passenger seat, train passenger seat, automobile passenger seat, bus passenger seat, or other type of vehicle passenger seat.

In another aspect, a plurality of the vehicle passenger seats are installed in a vehicle, such as an aircraft, train, automobile, bus or other vehicle. Each individual display system may be operably connected, such as by an electronic communication network, to a main entertainment system server in the vehicle. Alternatively, each display system may include an entertainment system module to provide a full range of entertainment system functionality and content.

DETAILED DESCRIPTION

The present invention is directed to video display systems for an entertainment system on a vehicle, such as a commercial aircraft, passenger train, automobile, bus, etc. Although the present invention is not limited to being configured for a passenger seat for commercial aircraft, in-flight entertainment systems are one of the intended uses for the display system of the present invention. One of the drawbacks of video displays in IFE systems is that they are subject to interruptions from passenger service announcements. For example, turbulence may be encountered and a cabin wide announcement may be made instructing everyone to fasten their seatbelt, interrupting the video display.

Another drawback of conventional IFE systems in general is a lack of ability for passengers to communicate with flight personnel through the IFE system. For instance, a passenger may wish to sleep during a flight and not be interrupted during the meal service. Past IFE systems have not provided a way to communicate this information to the flight crew.

Disclosed herein are embodiments that address some of the foregoing drawbacks and provide advantages over conventional IFE systems. Although the described embodiments are directed to a display systems configured for, and installed on, a commercial aircraft passenger seat, the present invention is not limited to display systems for aircraft, but can be utilized on any type of vehicle and vehicle seat.

Figure 1:
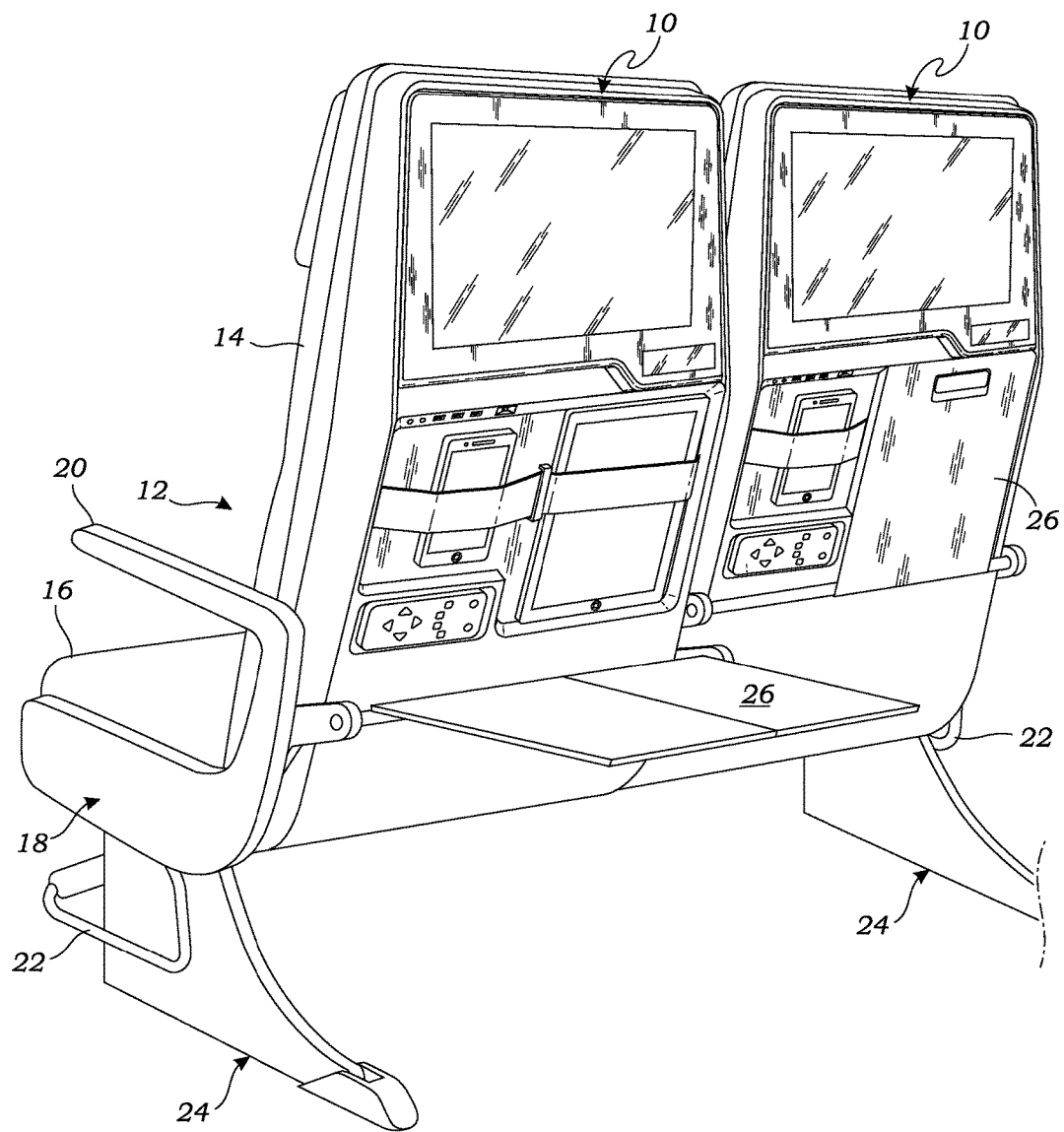
FIG. 1 is a perspective view of a pair of aircraft passenger seats with installed display systems, according to one embodiment of the present invention.

Referring to FIG. 1, one embodiment of a display system 10 installed in each of the aircraft passenger seat assemblies 12 is illustrated. Each passenger seat assembly 12 comprises a seatback 14 and a seating bottom 16 each coupled to a seat frame 18, thereby coupling the seatback 14 to the seating bottom 16. The seat frame 18 may also include armrests 20, located on each side of the seat assembly 12, a lower support bar 22, and a mounting assembly 24 for mounting the seat assembly 12 to the floor of the aircraft. The seat assembly 12 may also include a pivotable tray table 26 pivotably coupled to the seat frame 18.

Figure 4:
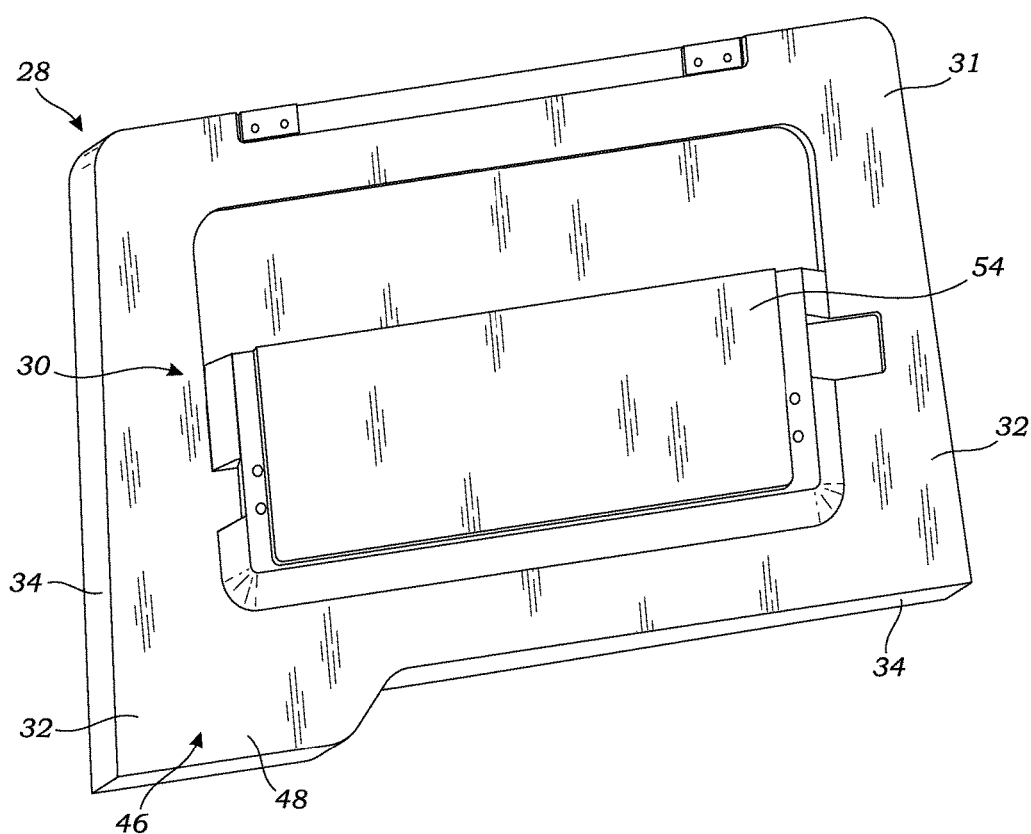
FIG. 4 is a rear, perspective view of the video display assembly for the display system of FIG. 1, according to one embodiment of the present invention.

Turning to FIGS. 2-5, the display system 10 includes a video display assembly 28, and an accessory assembly 33. The video monitor display assembly 28 is mounted to the backside (i.e., side opposite the seating surface) of the seatback 14. Referring to FIG. 4, the video display assembly 28 includes a display housing 30 configured to be mounted to the seatback 14. The display housing 30 has a frame 32 which may comprise a rear panel 31 and an edge wall 34 extending forward from the rear panel. The rear panel 31 and edge wall 34 may be integrally formed, such as from molded plastic or from metal, or other suitable material. Alternatively, the rear panel 31 and edge wall 34 may be separate parts fastened together by any suitable means, such as plastic parts heat welded together, metal parts welded, or any material parts fastened or bonded together.

The video monitor assembly 28 also has a front screen 36 that attaches to the display housing 30 to house the video monitor 40 therebetween. The front screen 36 may be a part of the video monitor 40, i.e., the screen of the video monitor 40, or it may be a separate protective screen which sits over the screen of the video monitor. The front screen 36 comprises a display screen 38 having a transparent or substantially transparent monitor portion 42 and a bezel portion 44. The monitor portion 42 is aligned with the display area of the video monitor 40 housed within the display housing 30. The video monitor 40 may be any suitable video monitor for displaying video, such as an LCD display, LED display, OLED display, etc. but preferably an LCD or OLED display.

In order to provide the maximum immersive user experience, the size of the video monitor assembly 28 and video monitor 40 are maximized to the extent possible when mounted to a seatback 14. Accordingly, the external edge of the display housing 30, which in this embodiment is formed by the edge wall 34 and the perimeter of the front cover 36, is configured to be substantially coextensive with the both side edges of the seatback 14 and the top edge of the seatback 14. In fact, for a given aspect ratio of the video monitor 40 and front cover 36 sized to match the video monitor 40 with a given width of the bezel portion 44, the width of the seatback 14 sets the limit on the size of the video monitor 40. The video monitor assembly 28 extends to the maximum size allowed by the width of the seatback 14 accommodating the largest size video monitor 40.

Figure 2:
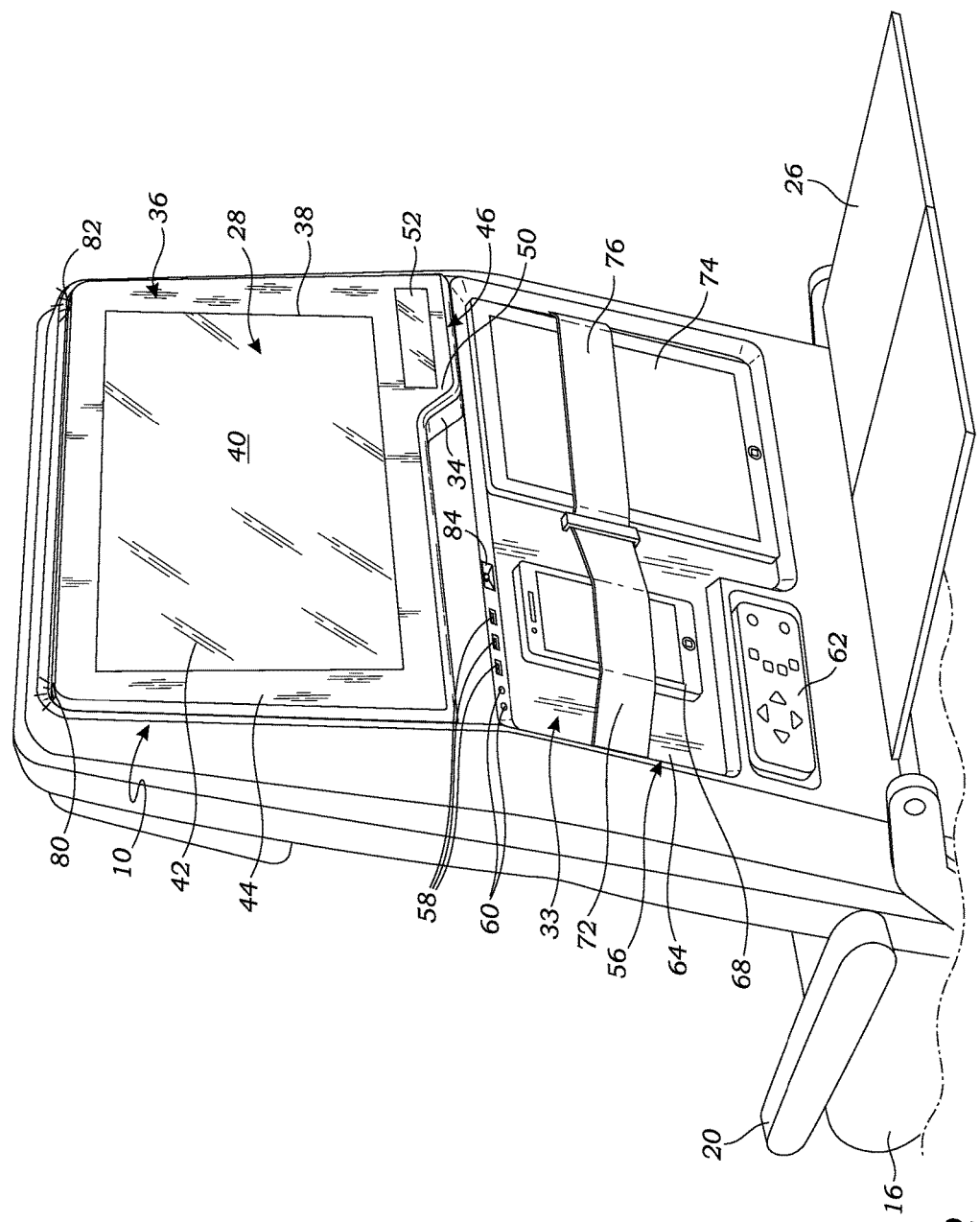
FIG. 2 is an enlarged, partial perspective view of an aircraft seat with installed display system of FIG. 1, according to one embodiment of the present invention.
Figure 3:
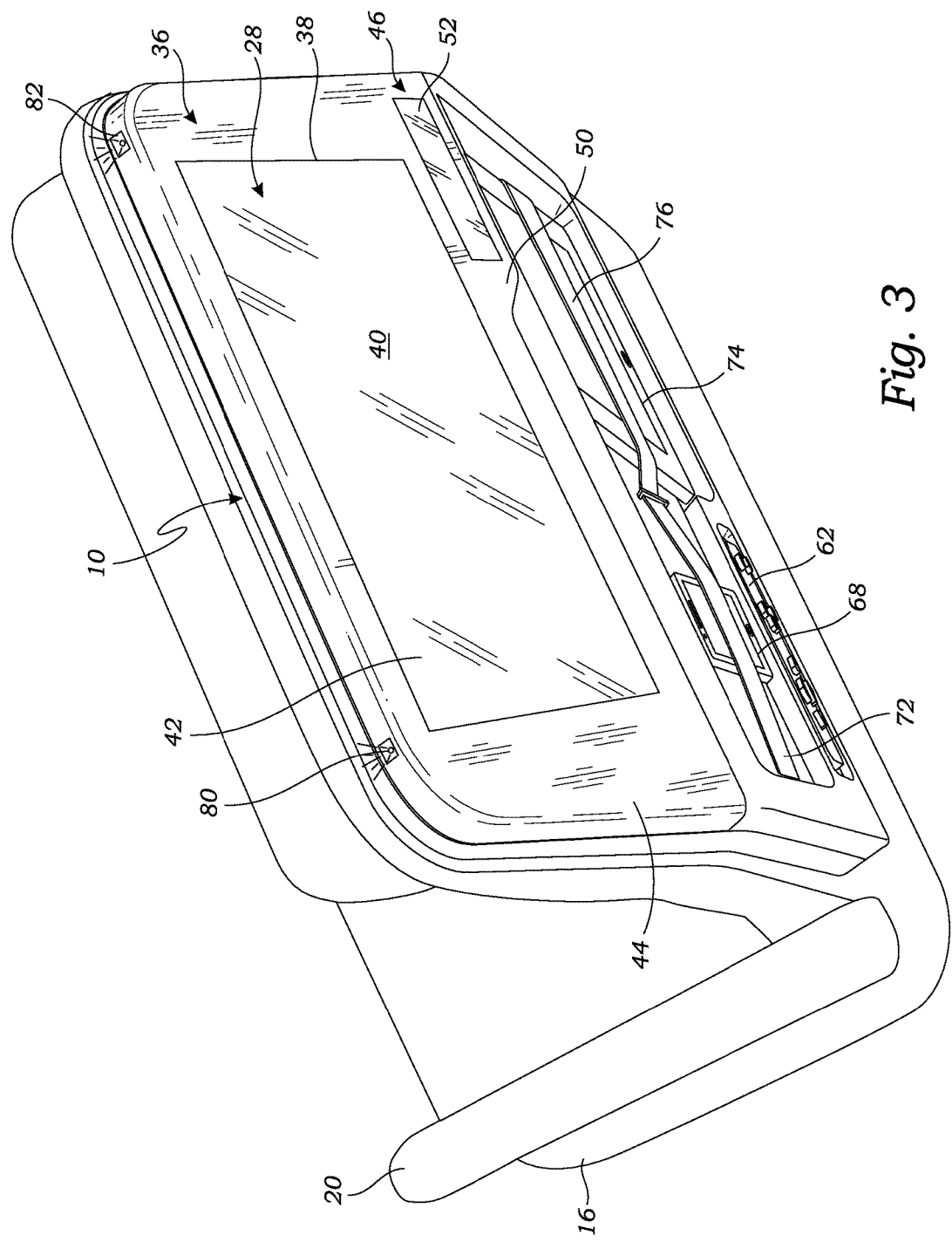
FIG. 3 is an enlarged, partial, perspective top view of an aircraft seat with installed display system of FIG. 1, according to one embodiment of the present invention.

Turning to FIG. 2, the video monitor assembly 28 also has two indicator lights 80 and 82 mounted to the display housing 30 at the top edge of the display housing, such as the top part of the edge wall 34. The indicator lights 80 and 82 are configured to be visible when external to the monitor display when lighted. The indicator lights 80 and 82 are configured to emit one of a plurality of different colors depending on the selected signal to be indicated. The indicator lights 80 and 82 provide a visible light signal based on a selection from the passenger or the aircraft crew. For instance, a passenger may select "Do Not Disturb" meaning the passenger does not want to be disturbed, even for a meal or drink service, in which case the indicator lights 80 and 82 may be lit with a red light. A blue light may indicate that the passenger has selected to "Call Flight Attendant" to signal the cabin crew to call on the passenger. The indicator lights 80 and 82 may be configured to emit additional colors based on other passenger or crew selections or to flash in different patterns, e.g., fast or slow flashing, combinations thereof and etc. The first indicator light 80 is located on the left side of the top of the display housing 30 and the second indicator light 82 is located on the right side of the top of the display housing 30. In this way, at least one of the indicator lights 80 and 82 is easily visible from either the left or the right side of the particular display system 10. The indicator lights 80 and 82 are preferably LEDs, but may be other kinds of lights.

Still referring to FIGS. 2-5, the video monitor assembly 28 also has a depending tab 46 which is located below the video monitor 40. In other words, the depending tab 46 extends below a main trapezoidal first portion of the video monitor assembly 28. To form the depending tab 46, the display housing 30 has a housing tab portion 48 (see FIG. 4) and the front screen 36 has a screen tab portion 50 (see FIGS. 2-3 and 5), with each extending lower than the main portion (also referred to as first portion) of the display housing 30 and front screen 36. The screen tab portion 50 is integrally formed with the monitor portion 42 and bezel portion 44 of the front screen 36 as a single integral part, but may be formed of separate parts attached together. Thus, the display housing 30 and front screen 36 each have a bottom edge having a first portion that is not a part of the tab portion 48 and 50 respectively, and a tab portion of the bottom edge which extends lower than the first portion. In addition, the tab portion has a shorter length than the first portion.

A tab display 52 is housed within the display housing 30 at the location of the depending tab 46, such that a screen of the tab display 52 is visible through a substantially transparent tab cover of the front screen. The tab display 52 is a smaller video monitor configured to display computer generated graphics, alphanumeric characters, and other information transmitted from a computer processor or graphics processor of the display system electronics module 54, such as social media notifications, estimated time to arrival or time remaining to destination, a graphical illustration of trip progress so far, fasten seatbelts, electronic devices off, and other information, by way of illustrative non-limiting examples.

The depending tab 46 may be located on the right side of the bottom of the video monitor assembly 28, as shown in FIGS. 1-4, or it may be located on the left side of the bottom of the video monitor assembly 28, or anywhere in between. In each case, the length of the tab portion of the bottom edge of the display housing 30 and front screen 36 is shorter than the first portion that is not a part of the tab portion.

The depending tab 46 aids providing an immersive user experience by avoiding interruptions. For example, if a passenger is watching a film on the video monitor 40 and there is a passenger service announcement to fasten seatbelts, the message may be displayed on the depending tab. The depending tab 46 may also be a touch display which provides controls for the display system 10, such as video controls for controlling the video being displayed on the display system 10, audio controls for adjusting audio volume, etc. As some examples, the tab display 46 may be an OLED, LCD or LED, but preferably an LCD or OLED display.

The accessory assembly 33 includes a variety of electronic peripherals providing additional conveniences to the aircraft passenger. The accessory assembly 33 is mounted to the backside of the seatback 14 adjacent and just below the video monitor assembly 28. The accessory assembly 33 comprises an accessory housing 56 configured to be mounted to the seatback 14. The electronic peripherals are mounted in the accessory housing. For example, three ports 58 are mounted in the accessory housing 56. At least one of the ports 58 is an audio and video input so that a passenger may connect their personal electronic device (tablet computer, notebook computer, laptop, phablet and etc.) to the audio and video input and watch content therefrom more conveniently on the video monitor 40. The audio and video input one of the ports 58 is preferably a standard HDMI (High Definition Multimedia Interface), which can receive both audio and video. It may also be a mini or micro HDMI input, but standard HDMI is presently the most common and therefore more preferable. Alternatively, one of the other ports 58 or another port 58 may be provided that is a mini or micro HDMI input. Other types of audio and video input may be provided as well, for example, a DisplayPort input, either standard or mini, but more preferably a mini DisplayPort input as it is more compact and increasingly a common standard. Wireless connectivity may also be provided, such as WHDI (Wireless Home Digital Interface) for example, or WirelessHD, which is based on a 7 GHz channel in the 60 GHz Extremely High Frequency Band for receiving video and audio from a personal electronic device.

At least one of the other ports 58 is a USB (universal serial bus). USB ports 58 may be used to power and/or charge portable electronic devices such as mobile phones, smart phone, tablet computers, notebook computers, etc. The USB ports 58 may also provide a communication link to data services such as an internet connection (e.g., if the vehicle has internet service), or exchanging data with a main entertainment system server, as described below.

Audio ports 60 may also be mounted in the accessory housing 56 for connecting headphones to access the audio signal to hear audio programs and/or the audio of the videos played on the display system 10. A user control, such as the handset control 62, may also be mounted in the accessory housing 56. The handset control 62 provides various controls for the user to input instructions and interact with the display system 10. The handset control 62 may have buttons, a joystick, a touchpad, a directional pad (e.g., 4-way directional pad), a keyboard, etc.

The accessory assembly 33 may also have a wireless charging station 64. The wireless charging station 64 is also mounted in the accessory housing 56. The wireless charging station 64 includes a device slot 66 for receiving a user's personal electronic device 68, such as a cell phone, smart phone, tablet computer, music player (e.g., iPod™), etc. The wireless charging station 64 may also include a strap 70 for retaining the personal electronic device 68 in the slot. The wireless charging station 64 has an inductive charging coil mounted in the accessory housing 56 within the front wall of the accessory housing 56. The inductive charging coil inductively transmits power from a power supply (e.g., the electronics module 54, seat electrical box, distribution box or other source) to the portable electronic device 68. The portable electronic device 68 must have a portable device inductive charging coil to receive the power from the inductive charging coil. The device inductive charging coil may be built into the portable electronic device 68, or it may be an accessory to the portable electronic device 68, such as an inductive charging sleeve or jacket that is connected to the portable electronic device 68. Suitable wireless charging jackets for use with the foregoing wireless charging station 64 are commercially available from Shenzhen QI Wireless Charging Technology Co., Limited of Guangdong, China.

Near field communication ("NFC") charging coils and antennas are also commercially available from the foregoing Shenzhen QI Wireless Charging Technology Co., and also from the TDK Corporation of Tokyo, Japan, and other suppliers. NFC charging coils and antennas may be installed internally in portable electronic devices for wireless charging and do not require a charging sleeve or jacket and are also suitable for use with the previously described wireless charging station 64.

The accessory assembly 33 may further have an auxiliary storage slot 70 for a passenger to store items, such as a tablet computer, a small notebook, magazines, etc. A strap 76 may be mounted to the accessory housing 56 for retaining the item in the slot 70.

The accessory assembly 33 also has a reading light 84 mounted to the accessory housing 56. The reading light 84 may be an incandescent light, an LED light or other type of light, but is preferably an LED for greater efficiency and reduced power requirements. The reading light 84 is directed to shine light toward the area of the tray table, specifically the area occupied by the tray table when it is in a lowered or deployed position. The reading light 84 is disposed below the video display assembly 28 which provides an advantage in that it is closer to the material being read and the light does not spread out and fade so much as when it is provided overhead, or other more distant location from the reading material. For compactness, the reading light 84 may include an integrated switch for activation and deactivation of the reading light. The switch may be activated by touch (capacitive touch switch) or mechanically activated by momentarily depressing the light 84. In alternate embodiments, a separate switch may be added by replacing one of the ports 58 with a switch or adding a switch adjacent the ports 58.

Figure 5:
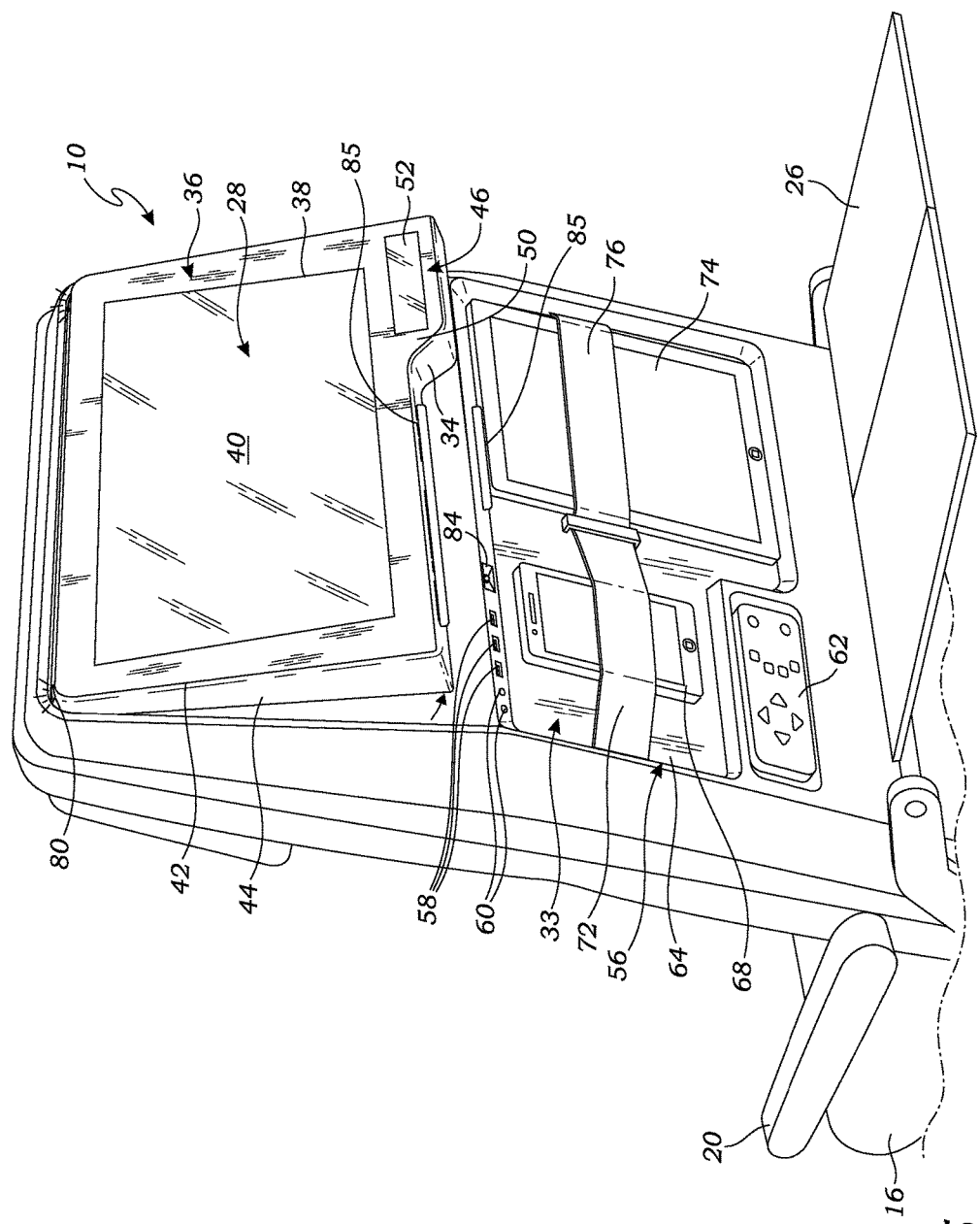
FIG. 5 is an enlarged, partial perspective view of an aircraft seat with installed display system of FIG. 1, with the video display assembly tilted, according to one embodiment of the present invention.

Referring now to FIG. 5, the video monitor assembly 28 and/or display housing 30 may also be configured to allow the video monitor 40 to tilt so that the viewing angle for the passenger can be adjusted. The display housing 30 is tiltably mounted to the seatback 14 so that the entire display housing 30 and video monitor 40 housed therein can be tilted. The display housing 30 may be configured to allow at least 5 degrees, or 10 degrees, or 15 degrees, or 20 degrees, or 25 degrees or 30 degrees of tilting. The display housing 30 may be tilted by simply grasping the bottom edge of the display housing 30 and moving it in or out to tilt the display housing 30 to the desired angle. The depending tab 46 may act as a handle for conveniently grasping the display housing 30 to tilt the display housing 30 and video monitor 40.

In an alternate embodiment, tilting of the display housing 30 may not be permitted, i.e., it is a fixed installation. A fixed installation is advantageous in that it generally provides for faster installation and also for removal and replacement. In the fixed installation embodiment, the video monitor assembly 28 slides into a seatback 14 and latches or hooks into place and is secured with a fastener, such as a screw.

With continued reference to FIG. 5, the display system 10 includes mood lighting 85. The mood lighting 85 comprises a row or strip of passenger selectively colorable lights, for example, blue, purple, red, yellow, and other colors. Allowing passengers to select mood lighting and the color thereof further enhances the immersive experience for the passenger. The mood lighting 85 may be provided on the lower edge of the video monitor 40. This advantageously permits the passenger to adjust the area covered by light from the mood lighting 85 by adjusting the angle of tilt of the video monitor 40. In addition, mood lighting 85 may be provided along one or more edges of the accessory assembly 33, at least preferably along the upper edge. Alternatively, the mood lighting 85 may be provided on both the video monitor 40 and the accessory assembly 33. The mood lighting 85 may comprise any suitable light source, but preferably comprises LEDs for greater efficiency and reduced power consumption. Preferably at least the color of each strip is selectable. In alternate embodiments, the color of individual lights may be selectable and also of the reading light 84.

Each of the electronic devices of the display system 10 is operably coupled to the display system electronics module 54. The display system electronics module 54 includes circuitry, electronic components, and one or more microprocessors for powering, controlling and driving all of the components of the display system 10, including the video monitor 40, the tab display 52, the indicator lights 80 and 82, the handset control 62, the USB ports 58, the audio ports 60, the reading light 84, and any other components of the display system 10. The electronics module 54 may contained within a single module box as shown in the embodiment of FIGS. 1-4, or it may comprise a plurality of module boxes and/or components which are operably coupled together. The electronics module 54 provides power conversion, video/audio signal routing and processing, data management, and other electronic functionality required to operate the display system 10. The electronics module 54 is also configured to connect to a communication network which is networked to a main entertainment system server in an aircraft.

Turning now to FIGS. 6-9, another embodiment of an in-flight display system 100 for installation in passenger seat assembly is illustrated. The display system 100 has essentially all of the same components, configuration and functionality as the display system 10, described above, except that video monitor assembly 28 does not have a depending tab 46, and associated components (e.g., the tab display 52) and related component configurations (e.g., the tab portions of the display housing 30 and front screen 36. Accordingly, like reference numbers in FIGS. 5-8 refer to like elements in FIGS. 1-4, and the description for like elements shall be applicable for all described embodiments wherever relevant.

As just some examples, the display system 100 has substantially the same video monitor assembly 28, accessory assembly 33, and their subcomponents, as described above with respect to the entertainments system 10. The display system 100 may also have the wireless charging station 64, indicator lights 80 and 82, mood lighting 85, and tiltable display housing 30 and video monitor 40. The display system 100 is also operably coupled to a display system electronics module 54, same or similar to the electronics module 54 described above with respect to the display system 10.

Figure 7:
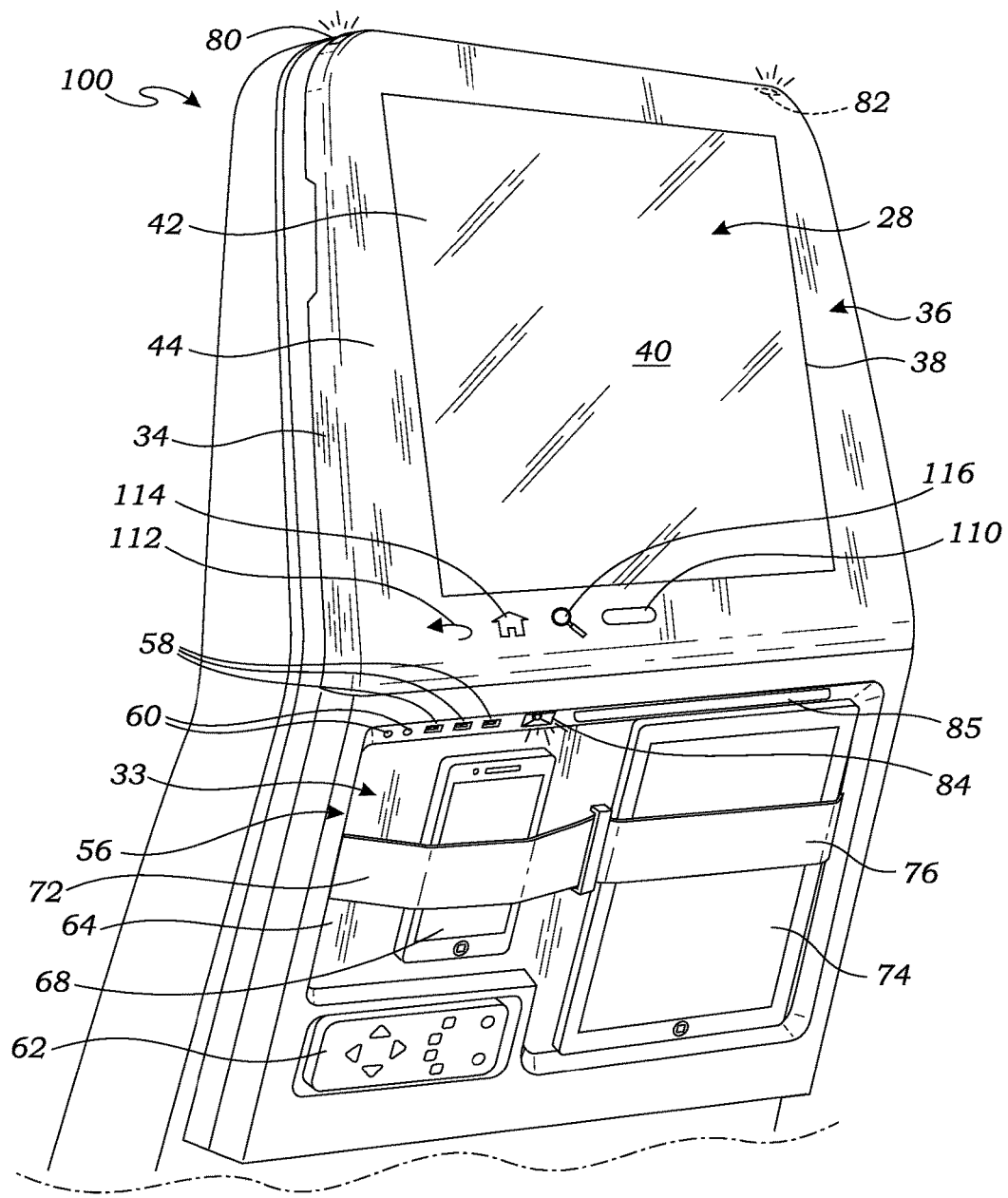
FIG. 7 is an enlarged, partial perspective view an aircraft seat with installed display system of FIG. 6, according to another embodiment of the present invention.

Referring to FIG. 7, the display system 100 preferably includes a proximity sensor 110 below the display screen 38 of the video monitor 40. The proximity sensor 110 senses proximity of an object thereto, such as a user's hand. When the sensor 110 senses such an object it activates backlights, revealing controls for interacting with the video monitor 40, such as a return or go-back control 112, a home control 114 and/or a search control 116 and an area encompassing the proximity sensor 110. In particular, the backlighting illuminates the controls and preferably an area encompassing the proximity sensor.

Other controls may be substituted therefore or additional controls included, such as video controls, e.g., volume up, volume down, pause/proceed, fast forward, rewind, and etc. Preferably the controls are of touch capacitive type. The proximity sensor 110 provides a more immersive experience for the passenger. For example, after a passenger starts a video on the video monitor 40 and a predetermined amount of time passes without an object being sensed by the proximity sensor 110, the display system 100 de-illuminates the backlights for the controls 112, 114, and 116.

Figure 6:
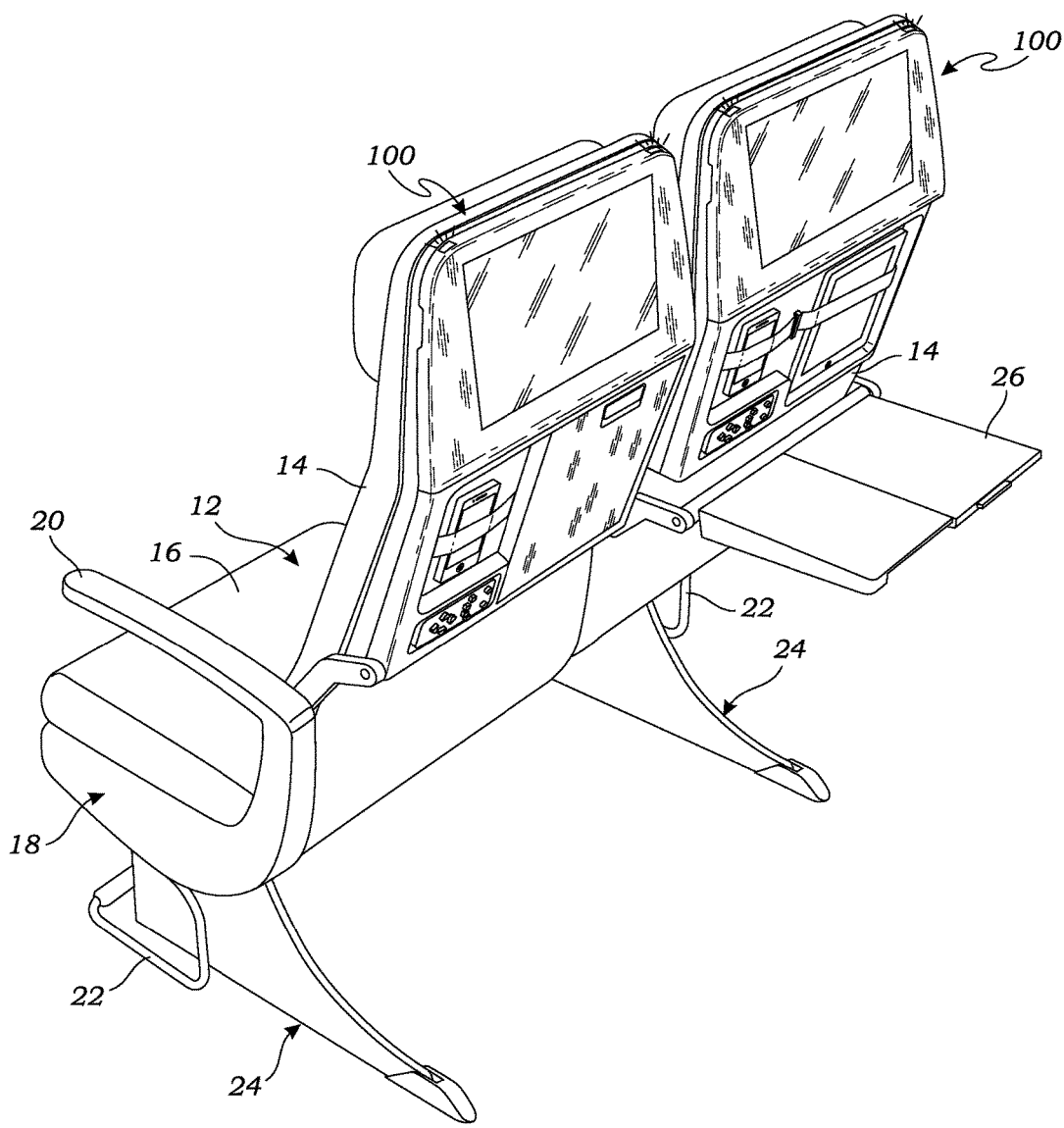
FIG. 6 is a perspective view of a pair of aircraft passenger seats with installed entertainment systems, according to another embodiment of the present invention.
Figure 8:
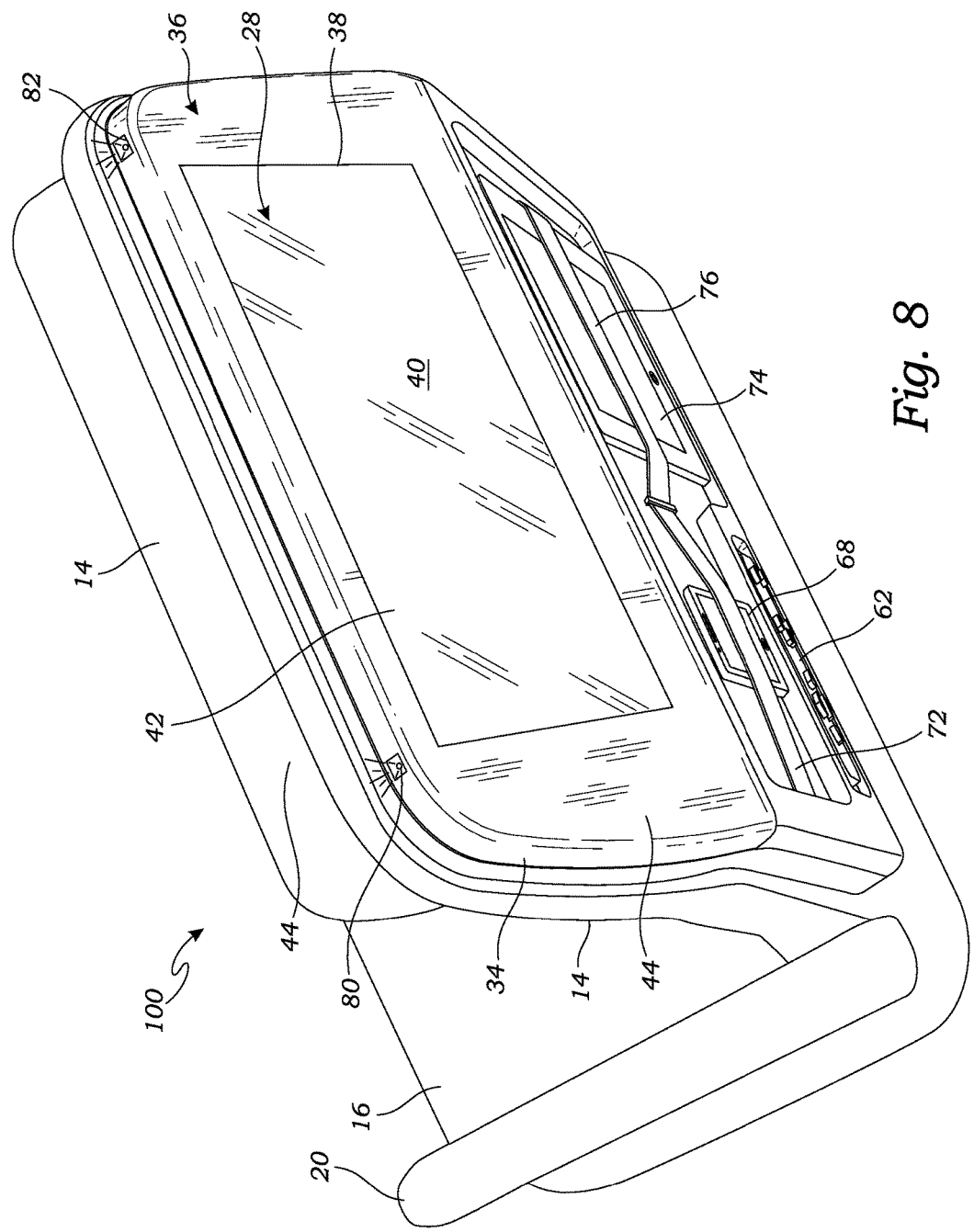
FIG. 8 is an enlarged, partial, perspective top view of the aircraft seat with installed display system of FIG. 6, according to another embodiment of the present invention.
Figure 9:
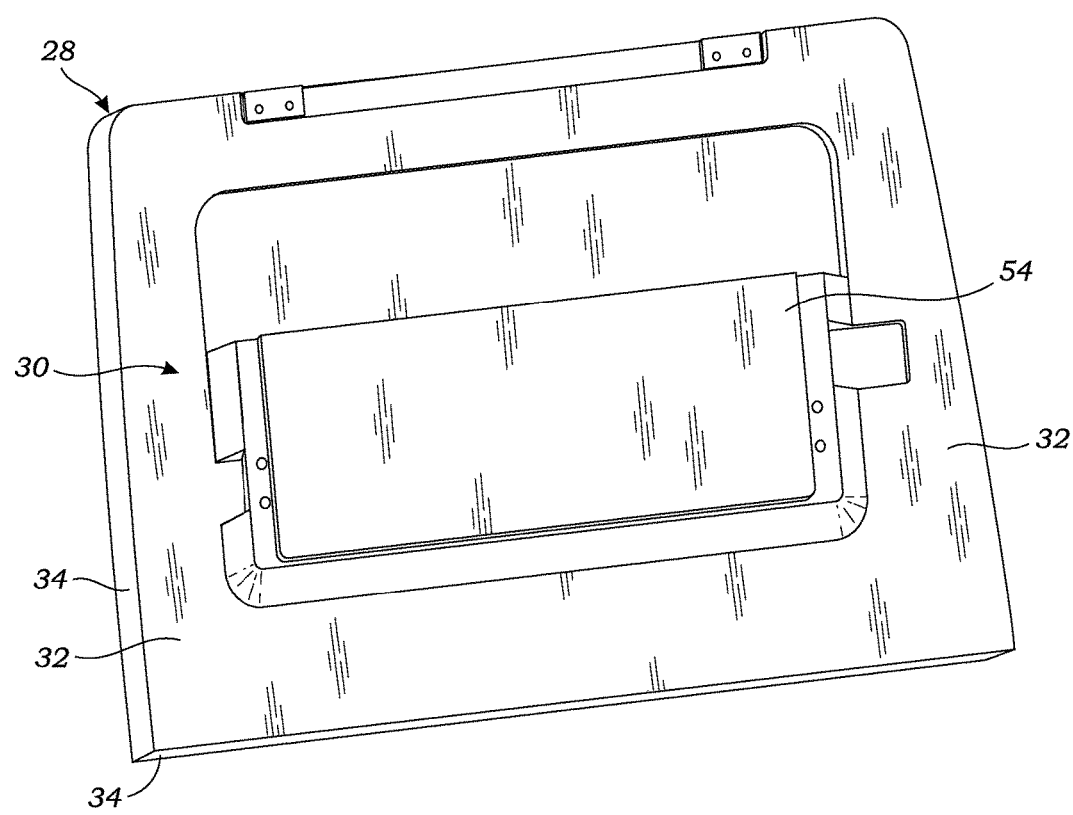
FIG. 9 is a rear, perspective view of the video display assembly for the display system of FIG. 6, according to another embodiment of the present invention.

If the passenger wishes to adjust a parameter of the video, such as to return to content selection for selecting a different video, the passenger moves their hand towards the video monitor 40 and the nearness of the passenger's hand is sensed by the proximity sensor 110 and backlighting for the controls 112, 114, and 116 activates. The passenger is therefore able to readily find the return or go back control 112. Once a sufficient amount of time passes without proximity of an object being sensed, the backlighting for the controls 112, 114, and 116 is once again switched off. FIG. 7 illustrates the proximity sensor 110 having recently sensed an object proximate thereto, while FIGS. 6 and 8 illustrate the situation where the proximity sensor 110 has not detected an object proximate thereto for a sufficient length of time, e.g., 10 to 30 seconds, that each backlight for each of the proximity sensor 110 and each of the controls 112, 114, and 116 has been switched off or de-illuminated. In an alternate embodiment, backlighting is provided only for the controls 112, 114 and 116 and not for the proximity sensor 110.

A proximity sensor 110 and controls 112, 114, and 116 may also be provided for the previously described embodiments described in connection with FIGS. 1-5. The backlight for each of the proximity sensor 110 and controls 112, 114, and 116 preferably corresponds to the color selected for the previously described mood lighting 85 for a more immersive experience. Alternatively, the color of the backlighting for the proximity sensor 110 and controls 112, 114, and 116 may be a different color or colors from the mood lighting to greater emphasize the location of the controls 112, 114, and 116.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

What is claimed is:

1. A display system for use with an entertainment system for a vehicle, the display system comprising:
   a display housing configured to be mounted to structure in a vehicle;
   a video monitor housed within the display housing such that a screen of the monitor is visible through a front side of the display housing;
   the display housing having a video monitor portion which encloses the video monitor; and
   a tab display housed within the display housing such that information displayed on the tab display is visible through the front side of the display housing.

2. The display system of claim 1, wherein the tab display is positioned at least partially within a bezel of a front screen of the video monitor.

3. The display system of claim 1, wherein the display housing further comprises a tab portion extending below the video monitor portion and the tab display is positioned at the tab portion.

4. The display system of claim 1, further comprising a first indicator light located adjacent an external edge of the display housing such that when lit it is visible external to the display housing, the first indicator light configured to emit one of a plurality of different colors according to a signal to be indicated.

5. The display system of claim 4, wherein the first indicator light is located on one side of the display housing, and further comprising a second indicator light located adjacent an external edge of the display housing on another side of the display housing such that when lit it is visible external to the display housing, the second indicator light configured to emit one of a plurality of different colors according to a signal to be indicated.

6. The display system of claim 1, further comprising a wireless charging station mounted in an accessory housing configured to be mounted to the seatback adjacent the display housing, the wireless charging station configured to inductively charge a portable electronic device via power a power source.

7. The display system of claim 6, further comprising:
   a plurality of USB ports mounted in the accessory housing; and
   at least one of a reading light and a selectively colorable row of lights mounted in the accessory housing.

8. A display system for mounting to structure of a vehicle, the display system comprising:
   a display housing configured to be mounted to structure of a vehicle, the display housing having a rear panel and a front cover affixed to the rear panel;
   a video monitor housed within the display housing such that a screen of the monitor is visible through the front cover; and
   a first indicator light located adjacent an external edge of the display housing such that when lit it is visible external to the display housing, the first indicator light configured to emit one of a plurality of different colors according to a signal to be indicated.

9. The display system of claim 8, wherein the first indicator light is located on one side of the display housing, and further comprising a second indicator light located adjacent an external edge of the display housing on another side of the display housing such that when lit it is visible external to the display housing, the second indicator light configured to emit one of a plurality of different colors according to a signal to be indicated.

10. The display system of claim 8, further comprising a wireless charging station mounted in an accessory housing configured to be mounted into the seatback adjacent the display housing, the wireless charging station configured to inductively charge a portable electronic device via a power source.

11. The display system of claim 10, further comprising:
at least one USB port mounted in the accessory housing; and
at least one of a reading light and a selectively colorable row of lights mounted in the accessory housing.

12. A passenger seat for a vehicle, the passenger seat comprising:
a seat assembly including a seatback and a seating bottom coupled to the seatback;
a display housing mounted to the seatback;
a video monitor housed within the display housing such that a screen of the monitor is visible through a front side of the display housing;
the display housing including a video monitor portion enclosing the video monitor; and
a tab display housed within the display housing and positioned such that information displayed on the tab display is visible through the front side of the display housing.

13. The passenger seat of claim 12, wherein the tab display is positioned at least partially within a bezel of a front screen of the video monitor.

14. The passenger seat of claim 12, wherein the display housing further comprises a tab portion extending below the video monitor portion and the tab display is positioned at the tab portion.

15. The passenger seat of claim 12, further comprising a first indicator light located adjacent an external edge of the display housing such that when lit it is visible external to the display housing, the first indicator light configured to emit one of a plurality of different colors according to a signal to be indicated.

16. The passenger seat of claim 15, wherein the first indicator light is located on one side of the display housing, and further comprising a second indicator light located adjacent an external edge of the display housing on another side of the display housing such that when lit it is visible external to the display housing, the second indicator light configured to emit one of a plurality of different colors according to a signal to be indicated.

17. The passenger seat of claim 12, further comprising:
an accessory housing mounted to the seatback adjacent the display housing wireless charging station mounted in an accessory housing; and
a wireless charging station mounted in the accessory housing, the wireless charging station configured to inductively charge a portable electronic device.

18. The passenger seat of claim 17, further comprising:
at least one USB port mounted in the accessory housing; and
at least one of a reading light and a selectively colorable row of lights mounted in the accessory housing.

19. The passenger seat of claim 12, wherein the video monitor includes a lower edge comprising a selectively colorable row of lights.

20. The passenger seat of claim 12, wherein the display housing extends substantially to both side edges and a top edge of the seatback.

* * * * *